United States Patent [19]

Kovacevic et al.

[11] Patent Number: 5,020,357
[45] Date of Patent: Jun. 4, 1991

[54] CALIBRATION STAND FOR SENSOR

[75] Inventors: Nebojsa Kovacevic, Plymouth, Minn.; Paul B. Hasselquist, Santa Fe, N. Mex.

[73] Assignee: N. K. Biotechnical Engineering Company, Minneapolis, Minn.

[21] Appl. No.: 395,757

[22] Filed: Aug. 18, 1989

[51] Int. Cl.$^5$ .................. G01L 25/00; G01D 11/30
[52] U.S. Cl. .................. 73/1 B; 248/371; 248/913; 248/542; 248/419
[58] Field of Search .................. 73/1 R, 1 B, 1 C; 248/371, 157, 419, 424, 904, 913, 542, 543

[56] References Cited

U.S. PATENT DOCUMENTS

| | | |
|---|---|---|
| 2,357,643 | 9/1944 | Floyd . |
| 2,845,794 | 8/1958 | Mazeffa et al. . |
| 2,955,454 | 10/1960 | Husher .................. 73/1 C |
| 2,957,342 | 10/1960 | Hanneman . |
| 3,456,486 | 2/1969 | Kross .................. 73/1 C |
| 3,498,103 | 3/1970 | Larson .................. 73/1 C |
| 3,574,279 | 4/1971 | Smith, Jr. .................. 72/7 |
| 3,608,353 | 9/1971 | Larson .................. 73/1 C |
| 3,675,464 | 7/1972 | Larson .................. 73/1 C |
| 3,694,636 | 9/1972 | Smith, Jr. .................. 72/8 X |
| 3,726,600 | 4/1973 | Carmack et al. .................. 356/253 |
| 3,918,302 | 11/1975 | Skelton et al. .................. 73/1 B X |
| 3,956,919 | 5/1976 | Varnas .................. 73/1 B |
| 4,160,325 | 7/1979 | De Nicola .................. 33/788 |
| 4,186,579 | 2/1980 | Eibe .................. 72/8 |
| 4,196,616 | 4/1980 | Argabrite et al. .................. 73/81 |
| 4,283,952 | 8/1981 | Newman .................. 73/579 |
| 4,292,835 | 10/1981 | Bickford .................. 73/1 B |
| 4,322,965 | 4/1982 | Bickford .................. 73/1 C |
| 4,537,067 | 8/1985 | Sharp et al. .................. 73/151 |
| 4,543,814 | 10/1985 | Heilman .................. 73/1 C |
| 4,606,421 | 8/1986 | Schroeder .................. 177/211 |
| 4,666,006 | 5/1987 | Wernimont .................. 177/211 |

FOREIGN PATENT DOCUMENTS

| | | | |
|---|---|---|---|
| 152115 | 3/1962 | U.S.S.R. | 73/1 B |
| 439707 | 1/1975 | U.S.S.R. | 73/1 B |
| 631792 | 11/1978 | U.S.S.R. | 73/1 C |
| 664059 | 6/1979 | U.S.S.R. | 73/1 C |
| 714195 | 2/1980 | U.S.S.R. | 73/1 B |
| 832373 | 5/1981 | U.S.S.R. | 73/1 B |

Primary Examiner—Tom Noland
Attorney, Agent, or Firm—Kinney & Lange

[57] ABSTRACT

A calibration stand for multiforce component sensors is capable of providing six components of force and moment to such sensors, using support and loading apparatus on the calibration stand. The stand is a compact, portable unit that provides for holding the sensor in a precise position by fully permitting pitch and lateral adjustments of the support assembly, as well as vertical and lateral adjustments for axial and "roll" or moment loading. The adjustability permits accurate applications of normal, lateral, and axial loads on the sensor being calibrated. Load cells are used to measure the application of the loads, and by proper instrumentation the output from the load cells can be used for recording data or providing digital displays. A coupling for carrying loads to the sensor permit determining whether shear loads are being introduced into the sensor and the adjustments permit zeroing out such shear loads so the loads are directed along the desired axes only. The calibration stand permits simultaneous loading in directions along more than one component of measured force.

20 Claims, 7 Drawing Sheets

CALIBRATION STAND FOR SENSOR

BACKGROUND OF THE INVENTION

1. Field of the Invention

The present invention relates to a sensor calibrator for multicomponent sensors.

2. Description of the Prior Art

There are multidegree of freedom force/moment sensor calibrators presently used, which are large structural frames with gravitational loads applied to calibrate the sensors. However, the accuracy is subject to variations and the calibrators are not portable.

A device that has a stand with adjustable end members for supporting a test piece, and a crosshead that can be used for inducing test signals is shown in U.S. Pat. No. 4,283,952. The test supports adjustably move toward and away from each other, and center under a crosshead. The test parts are stator blades that are excited by a member between the blades, and the supports each support an individual part which move toward each other. U.S. Pat. No. 2,957,342 shows a machine for measuring torque and tension, utilizing a test stand that has clamps for supporting a test threaded fastener, which is simultaneously tested under torque and tension.

A multipurpose test fixture is shown in U.S. Pat. No. 2,845,794. The fixture has provisions for self-alignment to compensate for setup or dimensional discrepancies. The fixture is designed for testing hooks and has the ability to prestress, tensile test and fatigue test standard specimens.

A large testing and checking device used for checking force measuring instruments is shown in U.S. Pat. No. 3,608,353. Various adjustments are shown for vertical positioning as well, but it does not test a sensor which measures multiple forces and moments.

A calibration device for strain measuring instruments is shown in U.S. Pat. No. 4,292,835. The device includes a loading frame having linear displacement transducers and force measuring apparatus to determine the stress and strain relationship of a bolt or stud. An ultrasonic extensometer strain measuring apparatus is also monitored, and is calibrated in accordance with the linear displacement and force measurement readings.

A device for calibrating torque transducers is shown in U.S. Pat. No. 4,543,814, and a high temperature strain gauge calibration fixture is shown in U.S. Pat. No. 3,956,919. The high temperature strain gauge calibration fixture calibrates high temperature strain gauges and has an arm which can be placed into a furnace for sensing.

A weighing structure with variable moment load cells is shown in U.S. Pat. No. 4,666,006. This device is primarily of general interest.

U.S. Pat. No. 2,357,643 illustrates a calibrating apparatus that has threaded members for applying loads and which is used for calibrating electrical resistance strain gauge units.

A load cell support is shown in U.S. Pat. No. 4,606,421, and this unit has a shift error adjuster for compensating for off-center loading, but does not show a calibration device for sensors.

SUMMARY OF THE INVENTION

The present invention relates to a calibration stand that includes precise adjustments for permitting testing of a multi-axis sensor that can sense loads in multiple force/moment directions. It is a relatively simple device to use, but improves accuracy and reliability. The force inputs can be sensed to insure the loads are applied as axial forces without introducing shear loads.

A base that has a longitudinal length and transverse width has a first sensor support assembly slidably mounted thereon, and a second axial load assembly mounted thereon and axially spaced from the first assembly. The first and second assemblies are mounted for movement toward and away from each other. These assemblies provide for precise adjustment of the sensor position axially. The first assembly includes an adjustment block for adjusting the pitch of the sensor axis to insure that there is perfect alignment of the axis of the sensor. The sensor in loaded through a calibration body that is coupled to the sensor at the same location as the part to be used with the sensor.

An overhead bridge crosspiece is used for supporting a vertical loading device for applying transverse loads to the sensor. Moment loads can be applied by positioning the calibration body and sensor so the transverse loads are applied axially offset from the center of the sensor. Roll moment loads are applied by utilizing weights extending from arms attached to the calibration body used for loading the sensor. Readings for calibration in six different force/moment directions can be obtained using a single portable calibrator that is very accurate and simple to operate.

DESCRIPTION OF THE PREFERRED EMBODIMENTS

Figure 1:
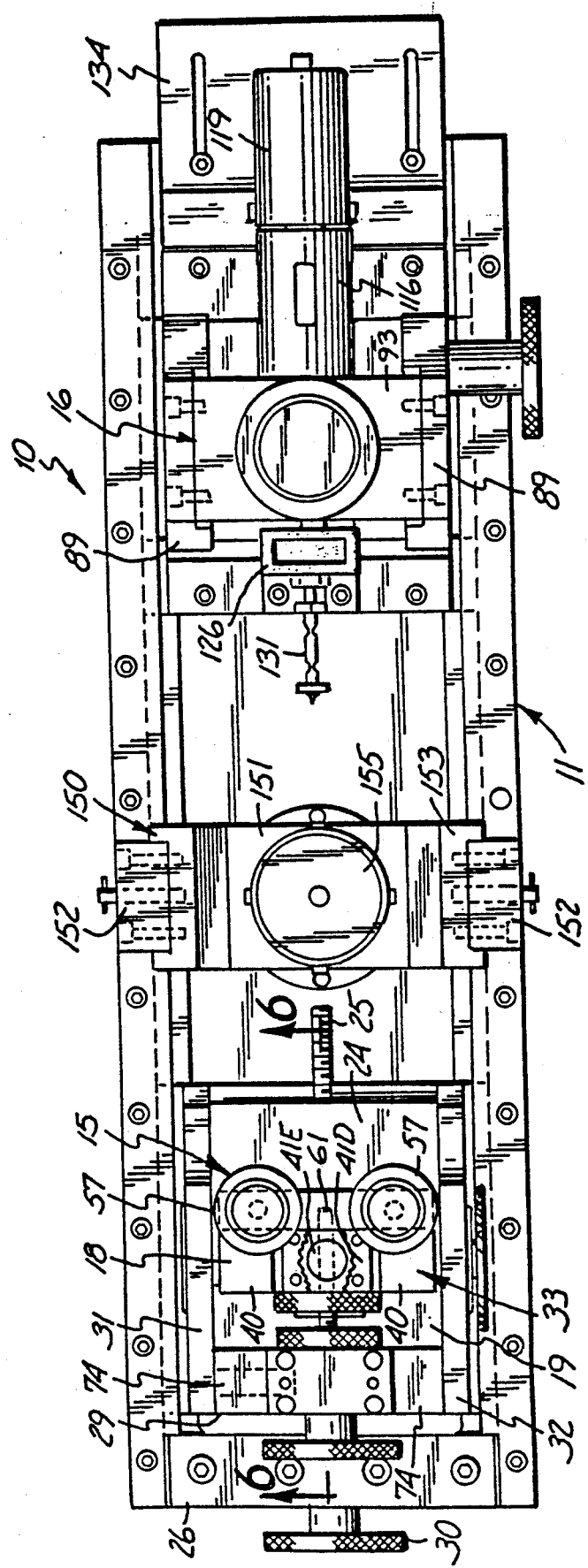
FIG. 1 is a top plan view of a calibration stand made according to the present invention.

A sensor calibration stand made according to the present invention is indicated generally at 10 (FIGS. 1 and 2) and has a base 11 that forms the mounting frame for the components needed for sensor calibration. The sensor calibration stand 10 is self-contained so that it can be transported from one location to another. The base 11 is mounted onto a slab indicated generally at 12, for providing a very stable, firm support. The base is normally leveled to be horizontal.

A first sensor support assembly, indicated generally at 15, is adjustably, slidably mounted adjacent a first end of the base 11, and a second axial loading assembly 16 is adjustably, slidably mounted on the base 11 adjacent a second end of the base. The first sensor support assembly 15 has a frame structure indicated generally at 18 that includes a base plate 19 (see FIG. 3). The base plate 19 has edge portions 19A and 19B which fit underneath a pair of guide clips 20, each clip being on one of the sides of the base 11 to locate and guide the frame 18.

The plate 19 supports a number of components, including a cross block 24 which is fixed to the plate 19 with suitable cap screws. A longitudinal adjustment screw 25 threads through an opening in the cross block 24 and extends parallel to the longitudinal axis of the base 11. The base end of the screw 25 is rotatably held from axial movement in a reaction block 26 that is fixed to the support base 11. A thumb wheel head 30 is mounted on the exterior end of the screw 25. The screw 25 also passes through an opening in a rear wall 29 of the sensor support assembly 15 so upon rotation of the screw the entire first sensor support assembly 15 is moved axially along the longitudinal axis of the support base 11.

Figure 3:
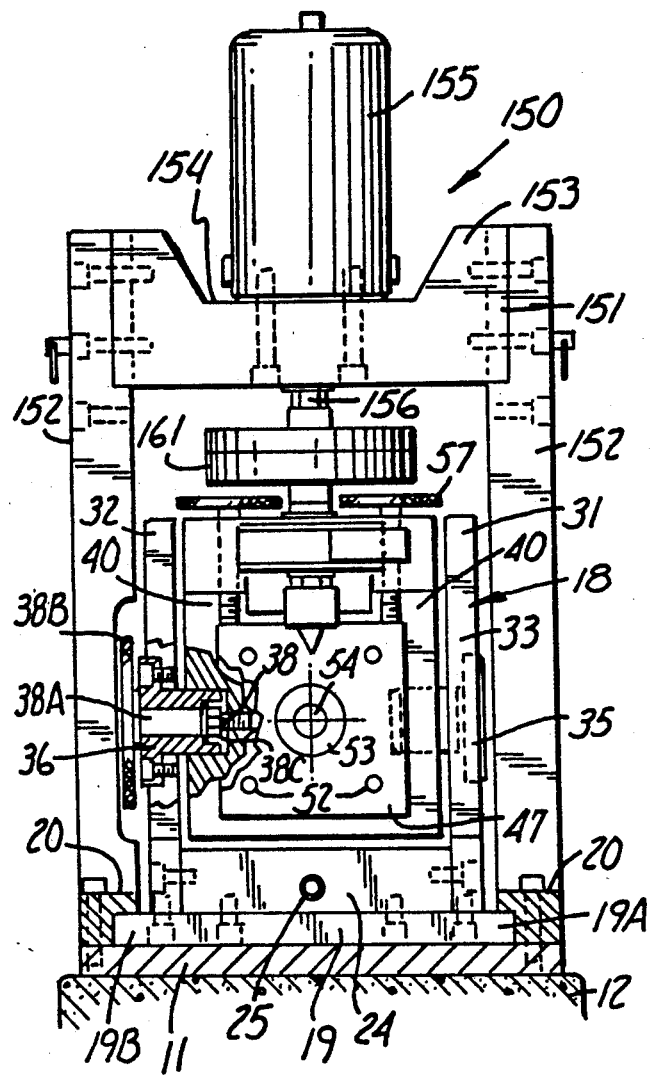
FIG. 3 is a sectional view taken on line 3—3 in FIG. 2.
Figure 7:
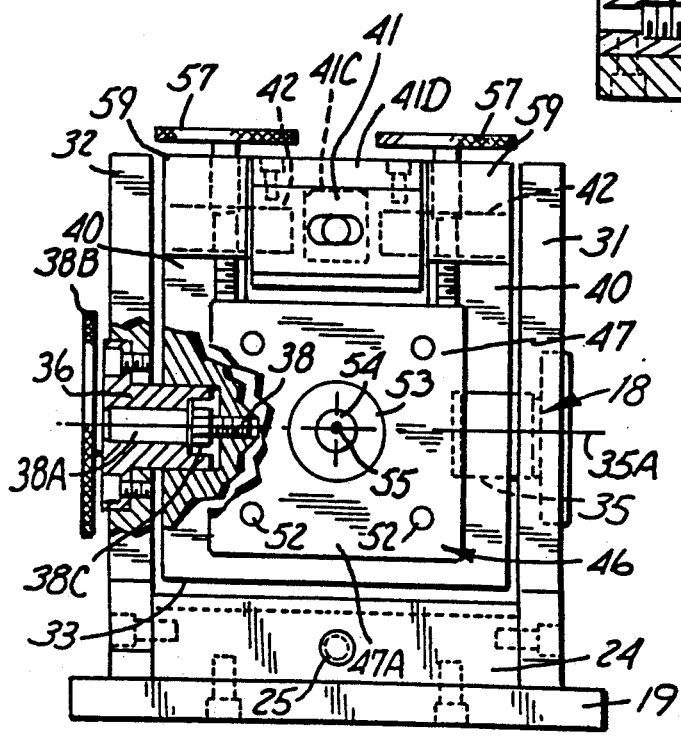
FIG. 7 is a front view of the support shown in FIG. 6.

The frame 18 of the first sensor support assembly 15, as can be seen in FIGS. 3 and 7, has upright side walls 31 and 32, respectively, which are fixed to cross block 24 and which are used for supporting a central pitch adjustment block 33. The pitch adjustment block 33 is positioned between and pivotally mounted on the walls 31 and 32 through a pair of trunnions 35 and 36, which fit into provided recesses on opposite sides of the pitch adjustment block 33 and pivotally support the pitch adjustment block 33. The pitch adjustment block 33 is adjustable in transverse directions, that is, side to side laterally of the base, through the use of an adjustment stud or screw 38 that threads into a small bore opening in the base of the opening for trunnion 36 in the side of the pitch adjustment block 33. Stud 38 is integral with a shaft 38A has is rotatably mounted in an axial bore in the trunnion 36. The shaft 38A has a thumb wheel 38B attached thereto and upon turning the thumb wheel 38 while the trunnion 36 is fixed in place on the side wall 32 with suitable cap screws, the lateral position of the pitch adjustment block 33 can be changed because of the threading of the end of the screw 38 into or out of block 33. A lock nut 38C acting against a washer retains the shaft 38A in position.

Figure 5:
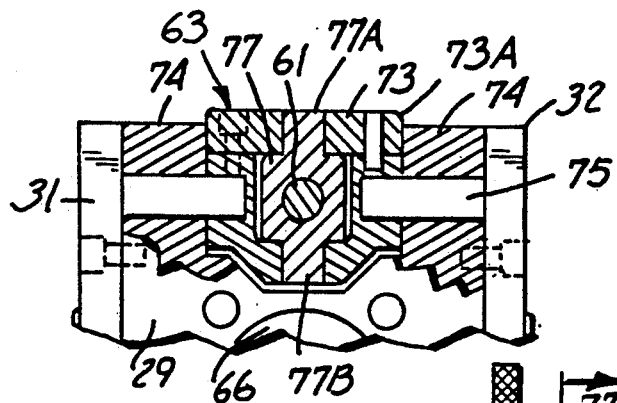
FIG. 5 is a fragmentary enlarged sectional view showing a mounting yoke and taken generally along line 5—5 in FIG. 6.
Figure 6:
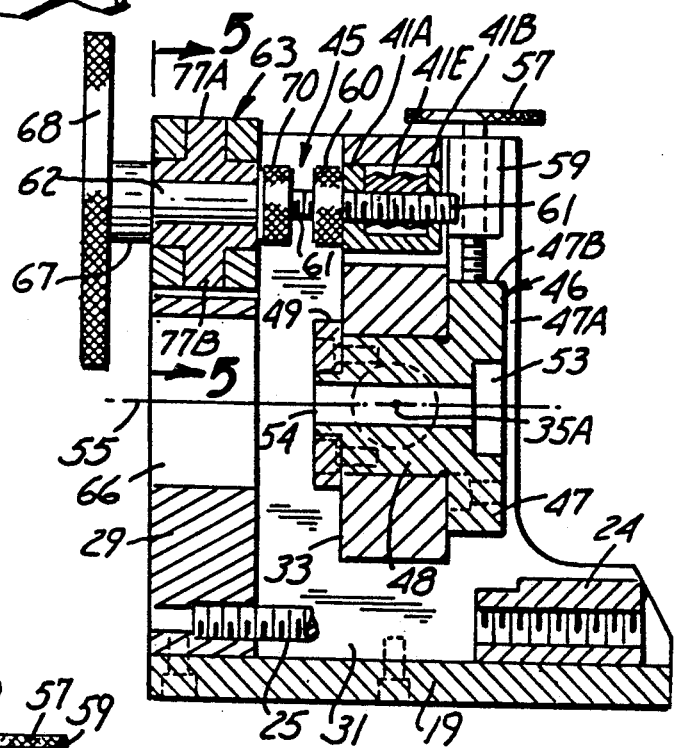
FIG. 6 is a sectional view of a support assembly taken along line 6—6 in FIG. 1.

As can be seen in FIGS. 5-7, the pitch-adjustment block 33 is also made up of a number of components, and is bifurcated at its upper end to form a pair of upright leg portions 40 that define a central receptacle into which a trunnion block 41 is pivotally mounted on pins shown in dotted lines at 42. The pins 42 are supported in the legs 40 and extend into the trunnion block 41. The trunnion block 41 has a central cylindrical receptacle 41C defined therein and has a cover 41D on the top. The receptacle 41C in trunnion block 41 forms front and rear upright wall portions 41A and 41B. These wall portions 41A and 41B are on the fore and aft sides of the trunnion block and have openings therein. The receptacle 41C has a cylindrical block 41E mounted therein for rotation in the receptacle 41C about a generally vertical axis. The cylindrical block 41E has a threaded bore in the midportions for receiving an adjustment screw, as will be explained. In FIG. 1, the cover 41D is broken away to show cylindrical block 41E in place in receptacle 41.

As can be seen in FIG. 6, the position of the pitch adjustment block 33 about the axis of the trunnions 35 and 36 (which axis is indicated at 35A in FIG. 6) is determined by an adjustable screw and lock nut assembly indicated generally at 45, which includes a screw that threads into cylindrical block 41E and reacts loads back to an upright wall 29 as will also be explained.

The pitch adjustment block 33 also includes a roll adjustment block 46 (see FIG. 5) which has a mounting head 47 that is positioned to the exterior of the pitch adjustment block 33. The roll adjustment block 46 also serves as a support for holding the sensor to be calibrated and has a cylindrical shaft portion 48 that is rotatably mounted in a provided opening in the pitch adjustment block 33. The shaft portion 48 is held in place with a suitable cap 49 that is attached to the end of the shaft 48 with cap screws. The cap 49 is mounted on a pilot shaft against a shoulder on the shaft and is on the opposite side of the pitch adjustment block 33 from the head 47.

The head 47 of the roll adjustment block, as shown, is square and has a plurality of mounting holes 52 therein that can receive cap screws for mounting adapters for rigidly mounting sensors to be calibrated on the front face 47A. A recessed pilot bore 53 is provided in the front face 47A and a through bore 54 extends through the shaft portion 48 from the front to the rear. The bore 54 has a central axis 55 which coincides with the central axis of a mounted sensor to be calibrated, and this is a reference axis of the calibration stand. The pitch of axis 55 can be adjusted by pivoting the pitch adjustment block 33 about axis 35A on the trunnions 35 and 36. Axis 35A intersects axis 55.

The position of the head 47 of the roll adjustment block 46, and specifically the position of the straight side edges of the head 47 about the central axis 55, is controlled by a pair of roll adjustment screws 57 which are mounted on support blocks 59 that extend forwardly from the main portion of block 33 and that are mounted on the leg portions 40. The blocks 59 are on opposite sides of the trunnion block 41 so they are laterally spaced from a plane that is defined by axis 55 and a line perpendicular to the base 11.

The screws 57 are threaded through provided openings in the blocks 59 and, as can be seen, have ends that bear on opposite end portions of one side surface of the head 47 of the roll adjustment block 46. The position of the roll adjustment block 46 about the axis 55 can be changed by adjusting the lengths of one of the screws 57 with respect to the other. In other words, one of the screws 57 can be extended farther while the other screw 57 is retracted and the angular position of the head 47 about the central axis 55 is precisely controlled. This will change the roll position of the mounting holes 52 on the head 47 and any sensor mounted thereon.

The adjustment of the pitch of the axis 55 relative to the base 11, about the pivot axis 35A is controlled by the pitch adjustment screw assembly 45, as shown in FIG. 6. The housing 41, and specifically upright wall 41A that is on the rear side of the housing 41 and thus to the rear of the pitch adjustment block 33, has an opening therein through which an adjustment screw 61 passes.

The adjustment screw 61 is threaded into a provided opening in the cylindrical block 41E and also passes through a slotted opening in the front wall 41B of the housing 41. A nut 60 is threaded on the adjustment screw 61 on the outer side of the wall 41A. The adjustment screw 61 has a shaft portion 62 that passes through a second trunnion mounting assembly 63 that is supported in the upright, fixed rear wall 29 of the first sensor support assembly 15. The rear wall 29 is between and fixed with respect to the side walls 31 and 32 on plate 19. The rear wall 29 has the bore for the screw 25, and has a large bore or opening 66 in the center portions which permit the installation of the cap 49 onto the shaft portion 48 of the roll adjustment block 46.

The pitch adjustment screw 61 has a head 67 which forms a shoulder that bears against the outer wall of the second trunnion assembly 63. A large thumb wheel 68 is fixed to the screw head 67 for use in adjusting the screw 61. A lock nut 70 is used on the screw 61 on the interior of the second trunnion assembly 63 to react loads on the pitch adjustment screw. The nut 60 can be used to lock the pitch adjustment block precisely in position after a suitable adjustment has been made. The nut 70 is also used as a lock nut.

The trunnion assembly 63 is shown in detail in FIG. 5 and 6, and comprises a trunnion block 73 that is mounted between upright side leg portions 74 at the top end of the rear wall 29. The trunnion block 73 is held on the side leg portions 74 with pivot pins 75. This permits the trunnion block 73 to pivot about a transverse axis, perpendicular to the axis of the adjustment screw 61. Block 73 also mounts a cross pivot block 77 which has upper and lower shaft portions 77A and 77B that are rotatably mounted with respect to the block 73. The upper shaft portion 77A is mounted in a removable cover 73A to permit assembly of the cross trunnion 77. The lower shaft portion 77B is pivotally mounted in block 73. The trunnion assembly 63 provides universal pivoting for screw 61, so that there is no binding or misalignment that occurs during adjustment of the pitch adjustment block 33 about the axis 35A.

The pitch of the axis 55 is controlled by the pitch adjustment screw 61 threading relative to the cylindrical block 41E which reacts loads to the housing 41 and, when lock nut 60 is tightened, the pitch adjustment block 33 is positively positioned. The nut 70 and head 67 react loads to the upright wall 29 to hold the pitch adjustment block in place.

Adjustment of the pitch adjustment block 33 laterally in a general horizontal plane, as viewed in FIGS. 3 and 7, using the lateral adjustment screw 38, is possible because the pins of trunnions 35 and 36 do not both bottom out in the bores in the pitch adjustment block 33 that are used for mounting the trunnions when the block 33 is centered. Some lateral movement of the pitch adjustment block is thus accommodated. The pitch adjustment screw 61 passes through slotted holes in the housing wall 41A and 41B, so that some transverse movement of the housing 41, and consequent slight skewing of screw 61 is permitted for lateral adjustment of the pitch adjustment block 33.

Figure 2:
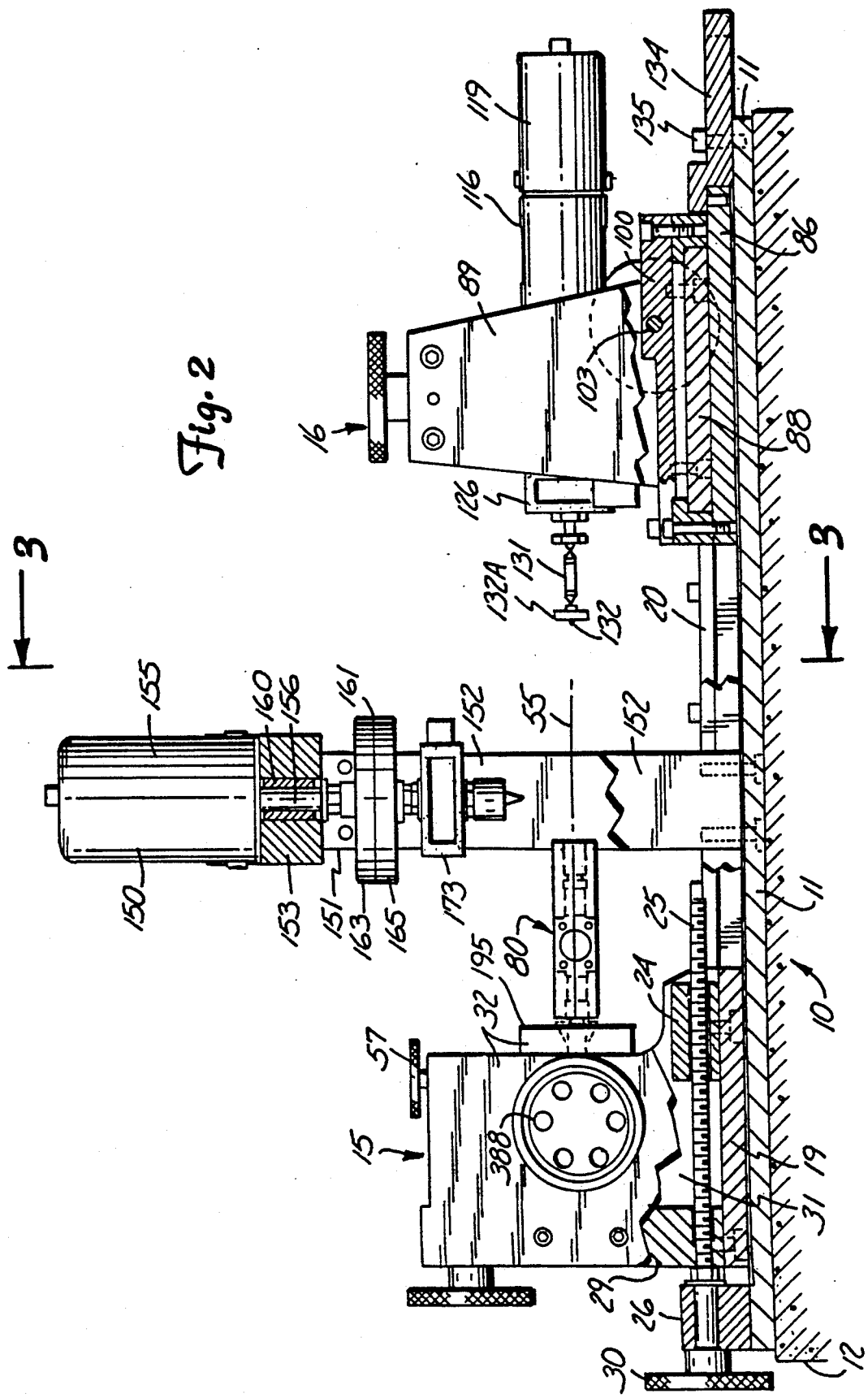
FIG. 2 is a side elevational view of the device of FIG. 1.

As can be seen in FIG. 2, the second axial loading assembly 16 is at an opposite end of the base 11 and spaced along the longitudinal axis of the base from the first sensor support assembly 15. Also, as can be seen in FIG. 2, a sensor and calibration body to be calibrated and indicated generally at 80 is held by the first support assembly 15 at one end of the sensor as will be more fully explained. The sensor axis extends along the central axis 55, also shown in FIG. 2. The first sensor support assembly 15 can be adjusted to bring the sensor to a centered position and the axial loading assembly 16 will be moved to engage a second end of the calibration body and sensor assembly 80.

Figure 8:
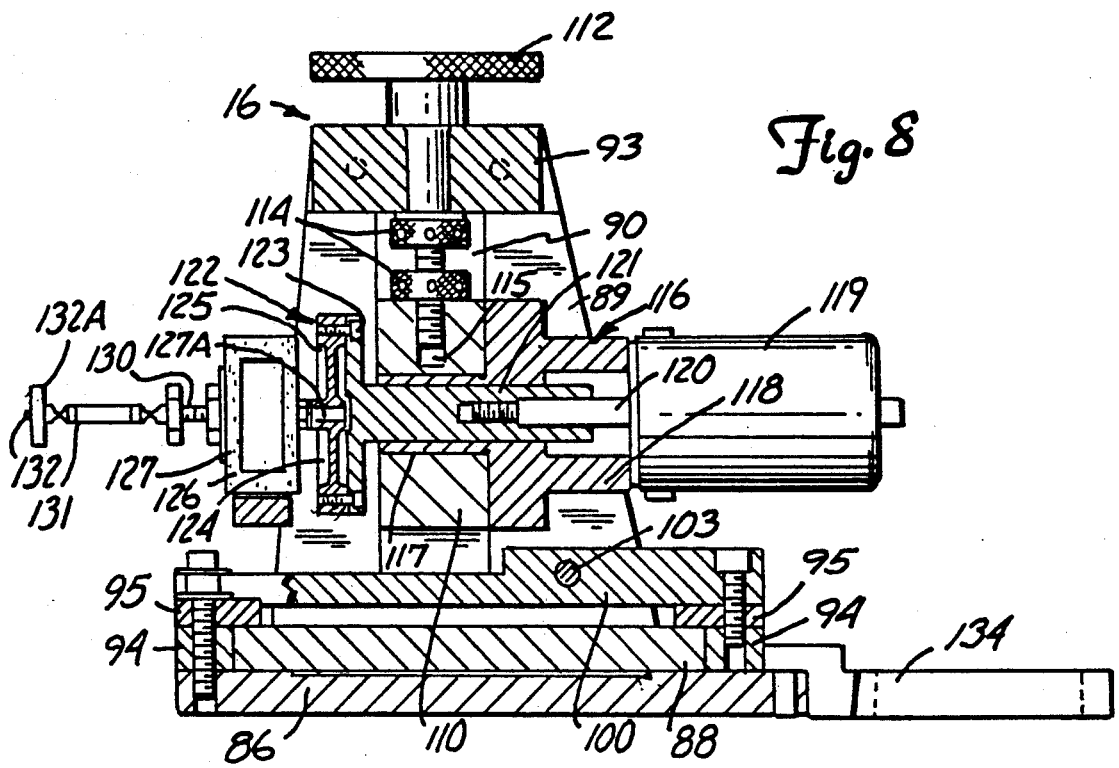
FIG. 8 is a side sectional view of a sensor support at the opposite end of a frame from the support shown in FIG. 6, taken as on line 8—8 in FIG. 9.
Figure 9:
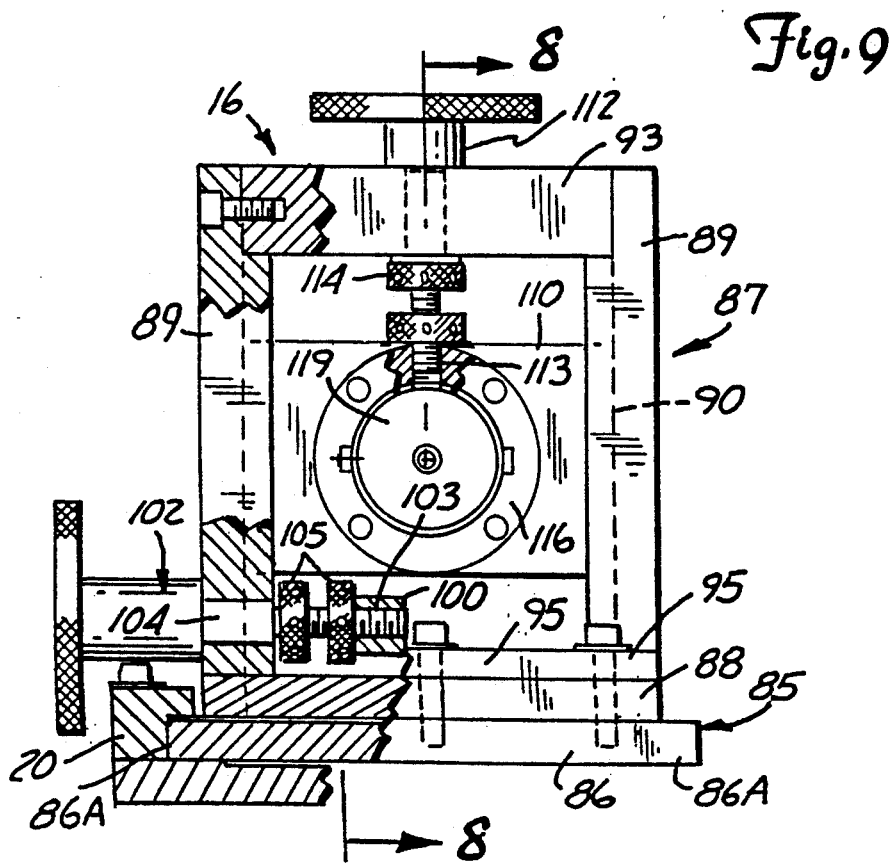
FIG. 9 is an end elevational view of the device of FIG. 8 as viewed from the right end thereof with parts in section and parts broken away.

The axial loading assembly 16 provides an axial load on the calibration body and thus on the sensor. The axial loading assembly 16 is shown removed from the base 11 in FIGS. 8 and 9, and it includes a base guide plate 86 that has outer edge portions 86A that fit under the provided lips of the guide clips 20 to slidably receive the plate 86 so that the axial loading assembly 16 can be adjusted longitudinally along the base plate 11. A frame assembly 87 is mounted onto the plate 86, and includes a bottom plate 88, and a pair of upright side plates 89 fixed to the bottom plate 88. The side plates 89 are spaced apart laterally and each of the plates 89 has a vertically extending groove 90 as seen in FIG. 8. These grooves 90 are in the midportions of the side plates 89. The side plates 89 are held together at their upper ends with a cross member 93 that is fixed to the side plates 89 and extends between them.

The guide frame assembly 87 is mounted onto the bottom plate 86 so that it can slide transversely for adjustment, that is, it can be adjusted from side to side. As shown in FIG. 8, a pair of cross spacer bars 94, 94 are supported on the top surface of the guide plate 86 and extend across the front and back of the plate 86. These spacer bars 94 are high enough so that they will provide a slight clearance between a lip forming strap 95 that is bolted in place on the spacers and the upper surface of the edges of plate 88. The spacers 94 and straps 95 form tracks for the plate 88. The upright side plates 89 are configured so that the straps 95 clear the edges of the side plates 89 at the front and back.

A fore and aft extending bar 100 is bolted to the top surfaces of the lips 95. It is thus fixed with respect to the bottom guide plate 86, and is not part of the frame assembly 87. The lateral or side to side position of the frame 87 with respect to the base 11 is controlled by a lateral adjustment screw 102 (FIG. 9) that has a threaded shank 103 that threads into a threaded opening in the bar 100. The screw also has a shank portion 104 that is rotatably mounted in one side wall 89 and axially held by a shoulder and one lock nut 105. By turning the screw 103, the frame assembly 87 can be moved a small distance laterally for alignment purposes and then locked in place with a suitable lock nut 105 acting against bar 100. The bar 100 has a greater vertical height in the rear portions than at the front as shown.

The frame 87 carries a slide block 110 that has end portions that are mounted for slidable vertical movement in the grooves 90 in the side plates 89. The vertical position of the slide block 110 is controlled through a vertical adjustment screw assembly 112 that is mounted on the crossbar 93, and is axially held and rotatably mounted therein. The screw assembly 112 has a threaded screw portion 113 that is threadably mounted in a suitable bore 115 in the slide block 110. The bore 115 is long enough to permit the screw to move in and out a selected amount in adjustment. Suitable lock nuts 114 are used for providing for a fixed positioning of the slide block between the crossbar 93 and the base. By threading the vertical adjustment screw 112, when the nuts 114 are loosened, the position of the central axis of the slide block can be vertically changed and selected for precise adjustment and the slide block can be locked in place.

Figure 12:
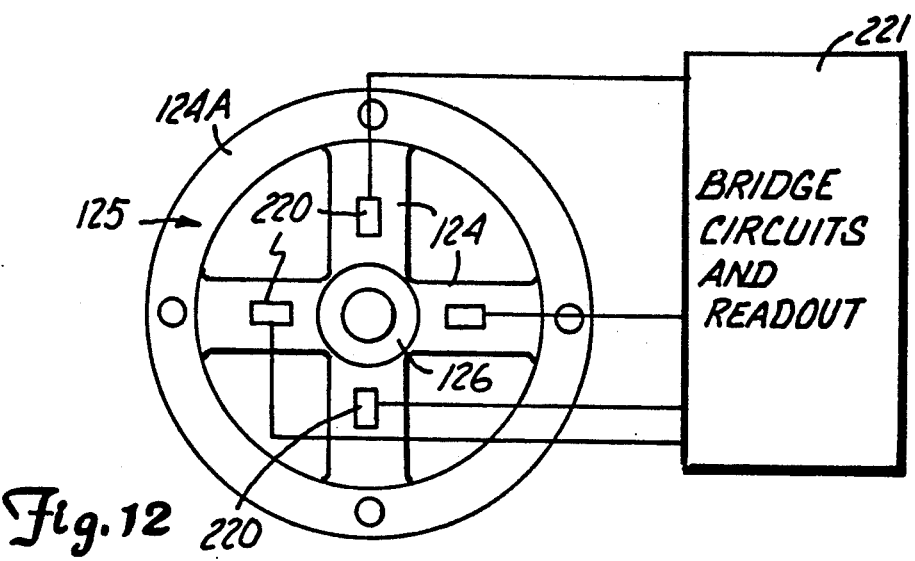
FIG. 12 is a plan view of a shear load sensing spider used in the calibration load paths.

An adaptor 116 is mounted in a central bore in the slide block 110, and is fixed in position with suitable cap screws. The adaptor 116 has a central tubular sleeve 117 that fits into the bore in the slide block 110, and has an outer hub portion 118 that mounts a pneumatic cylinder assembly 119. The pneumatic cylinder has an internal piston, and an extendable and retractable rod 120. The rod 120 is in turn drivably connected to a shaft 121 that slides axially in the bore in sleeve 117. Shaft 121 has a zero shear flexure coupling 122 on the side of the slide block 110 opposite from the pneumatic cylinder 119. The flexure coupling 122 faces the first sensor support assembly 15. The flexure coupling is for sensing eccentric loading and for providing an indication of zero shear loading on the sensor in axial direction, which means the force applied will be truly along the desired axis. The flexure coupling 122 includes a mounting plate or flange 123 having a hub fixed to shaft 121. As shown in FIG. 12, a flexure spider 125, which has four arms 124 also has an outer rim 124A fixed to the outer ends of the arms. The rim 124A is bolted to a rim of plate 123. A central hub 126 is carried by the arms 124. The central hub 126 is connected to the plate 123 only through the arms 124, which act as flexure connections in axial direction, but which are stiff connections in lateral and rotational directions.

The central hub 126 is adapted to receive and support a load cell 127 using a connection pin or shaft 127A on an inner side of the load cell. The load cell 127 has a support screw 130 mounted on an outer side thereof and extending axially outwardly. The screw 130 is adapted to connect to an axial loading flexure member 131, which provides a flexible universal coupling adapted to carry axial loads and yield easily under lateral loads. This axial loading flexure member has a centering pin 132 on an outer end that is used for receiving and centering a receptacle on a sensor calibration body, which is supporting a sensor to be tested.

Thus, the axial loading assembly 16 is mounted for adjustable movement axially along the base 11. The center pin 132 can be moved laterally by adjusting the lateral adjustment screw 102, and vertically by adjusting the vertical adjustment screw 112. The center pin 132 is precisely adjusted for the test and held coaxial with axis 55 by using the locking nuts 105 and 114. The position of assembly 16 along the longitudinal axis of base 11 can be held with a backstop bracket 134 which is attached to the rear of plate 86 with a cap screw and has an outer end with a longitudinal slot for receiving a cap screw 135 (FIG. 2). The cap screw 135 threads into base 11 for positively fixing the assembly 16 in axial position on the base 11. Any fine or small adjustments in axial position of the calibration body and sensor assembly to be calibrated, after the axial loading assembly is in a position nearly correct, are provided by screw 25 moving block 33 and extending the rod 120 as needed.

Figure 4:
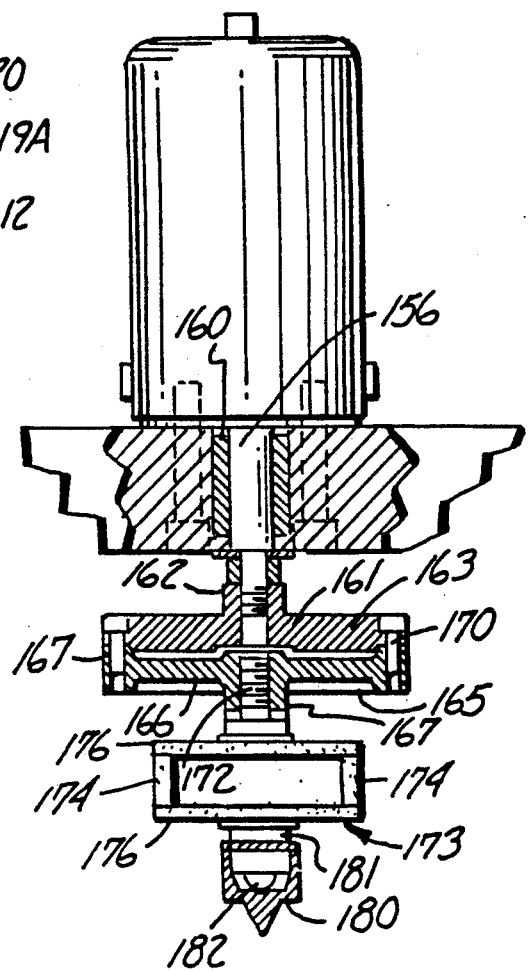
FIG. 4 is an enlarged view of a central loading member with parts in section and parts broken away.

A lateral (vertical) loading assembly indicated generally at 150 is shown in FIGS. 1 through 4 and as shown comprises a bridge-type support 151 that has a pair of upright legs 152 on opposite sides of the base 11, and a cross member 153 that is supported on the upper end of the legs 152. It can be seen that one of the legs 152 has a recess to provide clearance for the thumb wheel 38B. Crossover member 153 forms a type of a saddle having a support surface 154 on which a pneumatic actuator 155 is mounted. The actuator 155 is a linear actuator which has an outer cylinder and an inner piston (not shown) which will move an output rod 156 in a direction perpendicular to the horizontal, longitudinal axis of a sensor to be tested. The bridge assembly 151 is mounted with suitable cap screws to the base 11, and suitable cap screws can also hold actuator 155 in position. The actuator 155, as shown in FIG. 4, has a portion of its rod slidably mounted in a bushing 160 supported in a cross member 153.

The outer end of the rod 156 is threaded and a zero shear sensing flexure coupling 161 (FIG. 4) is connected in the load path and is constructed identically to flexure coupling 122. The flexure coupling 161 has a mounting plate 163 which has a central hub 162 that is threaded on the end of the rod 156. The plate 163 has a plane that is perpendicular to the central axis of the rod 156, and it forms a backing plate for a four armed flexure spider 165.

The spider 165 has arms 166 that are thin enough so that they deflect under axial loads and, as will be explained, have strain gages thereon to permit measuring unequal loads on the arms 166. An outer peripheral rim 167 is connected to the arms 166 of the spider 165. Rim 167 is also connected to the outer periphery of the plate 163 through suitable cap screws 170. The arms 166 have a hub 167 in the center thereof which is co-axial with the hub 162. Hub 167 has a threaded opening that receives a mounting screw or pin 172 for a load cell 173. The load cell 173 is of design to apply and measure loads transferred to the calibration body and to the sensor to be tested.

The load cell 173 has a pair of side members 174 that are spaced apart and are connected between a top plate 175 and a lower plate 176. Suitable strain gauges can be put on the plates 175 and 176 for measuring load applied along the axis of shaft 156. A load applying member 180 is mounted onto a spindle 181 fixed to plate 176 of load cell 173, and is used as an alternate way to locate position before applying a load to a calibration body on which a sensor to be tested is mounted.

The flexure assembly 163 is identical to the load carrying assembly 122 in that there is a spider that carries the axial load to the load cell 127.

It can be seen that loading can occur axially and transversely, at the same time, and that the loading arrangement eliminates the handling of large dead weight gravitational loads so the unit can be made smaller.

SENSOR MOUNTING AND CALIBRATION BODY

Figure 10:
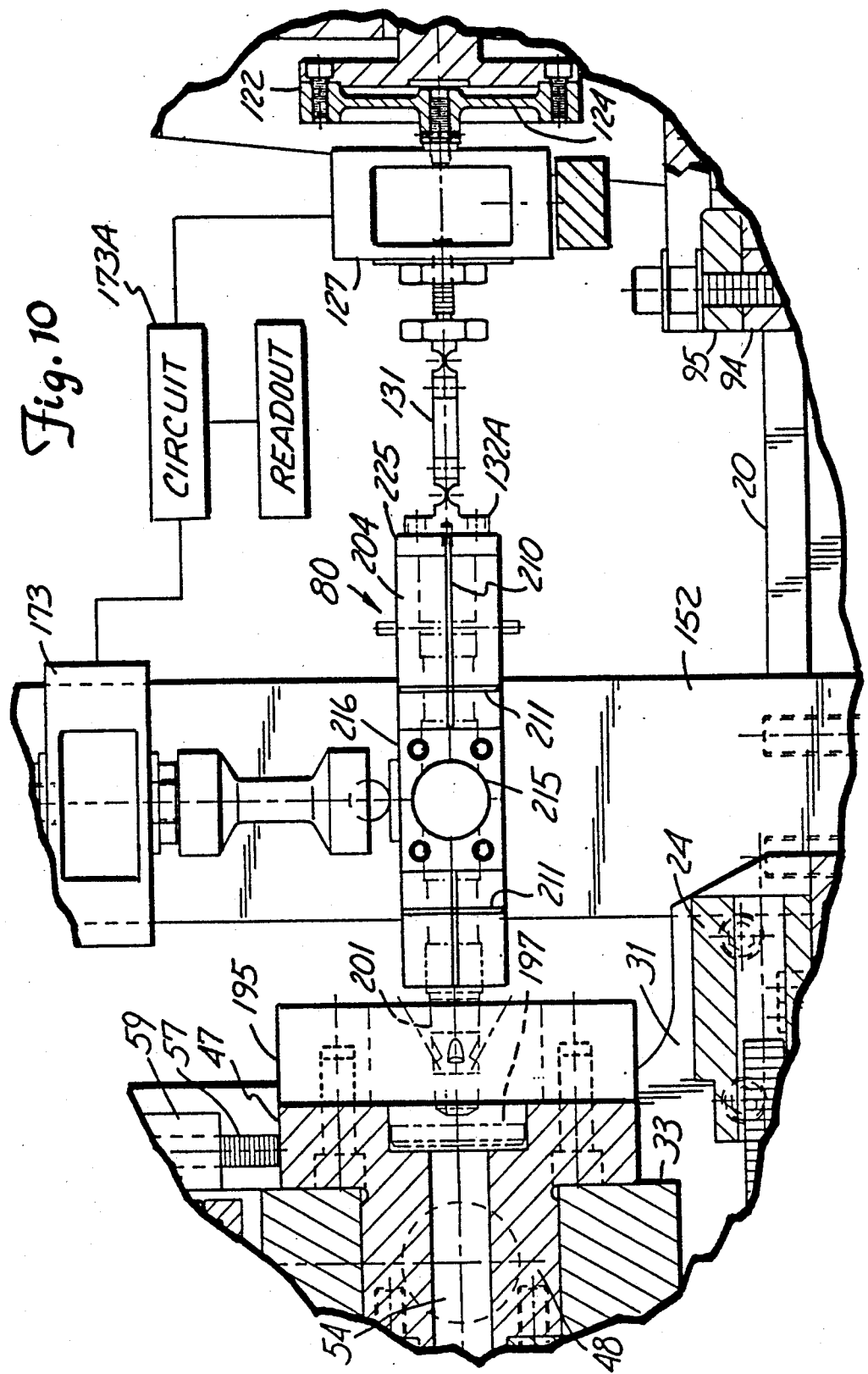
FIG. 10 is a fragmentary view showing a calibration body supported on a sensor held in position for calibration.
Figure 11:
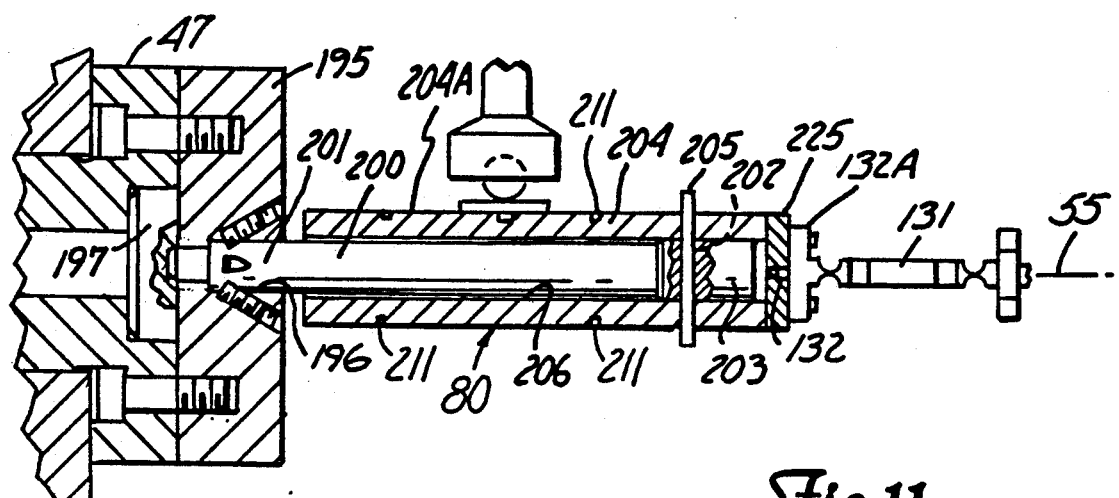
FIG. 11 is a fragmentary sectional view of a calibration body and sensor, schematically showing a loading path for calibration.

In FIGS. 10 and 11 in particular, a way of supporting a sensor for calibration is shown. The calibration body-sensor assembly indicated at 80 is shown in FIG. 10 supported and positioned for axial loading, and schematically shown for applying vertical loads. As shown in FIGS. 10 and II, the roll adjustment block 46, which has a head 47, is shown in position in the pitch adjustment block 33. It can thus be seen that any tilting of the pitch adjustment block 33 will also move the head 47 about transverse axis 35A. The front face 47A of the head portion 47 is used for mounting a sensor adaptor 195, which is a plate that is bolted into place with cap screws extending into the openings 52. The adaptor 195 has a collet type support that is perhaps best seen in FIG. 11. The adapter 195 has a gently tapered bore 196 in the center thereof. The bore 196 is made to receive a mating taper at one end of a sensor shown schematically at 200. The sensor 200 is a sensor that is to be calibrated and, for example, is a type of sensor used in a wind tunnel which is needed to sense loading in drag (axially along axis 55), pitch and yaw as well as roll moments about axis 55, and lateral loads, both vertical and horizontal. The sensor 200 has a mounting end portion 201 that fits into the bore 196, and suitable set screws can be used for forcing the mounting portion 201 into the bore so that it rigidly locks into the bore and is rigidly supported on the adaptor 195. It can be seen that the adaptor has a pilot hub 197 that fits into the pilot bore of the head 47 so that it is very precisely located.

The sensor 200 has an attachment opening, indicated at 202 in FIG. 11 for receiving the connection to a body which the sensor is used to monitor. The outer end portion 203 of the sensor fits tightly into a provided bore 206 of a calibration body 204. A pin 205 is used for precisely positioning the sensor 200 in the calibration body 204 on the interior of the bore 206. The bore 206 is spaced from the sensor 200 along the sensor length except for portion 203 so transverse loading on the calibration body will cause loads to be applied to the sensor through pin 205 only.

Thus, the calibration body 204 will be loaded, but the loads will be transferred to the sensor only through the pin 205 as it is loaded.

The calibration body 204 is square in crosssection, and it is precisely centered around a central axis that coincides with the axis 55 when the sensor is mounted in adaptor 195. The calibration body has four side surfaces that are mutually perpendicular, and on the exterior thereof there are longitudinal grooves indicated at 210 on each of the surfaces, as well as a pair of transverse grooves 211 on each of the surfaces. There can be additional openings or precisely located dowel holes at positions for applying loads in order to maintain the correct amount of off set from the pin 205 to simulate direct electrical center loading, or to simulate moments about the central transverse axis of the sensor (pitch or yaw) applied by the vertical loading cylinder 155.

Figure 13:
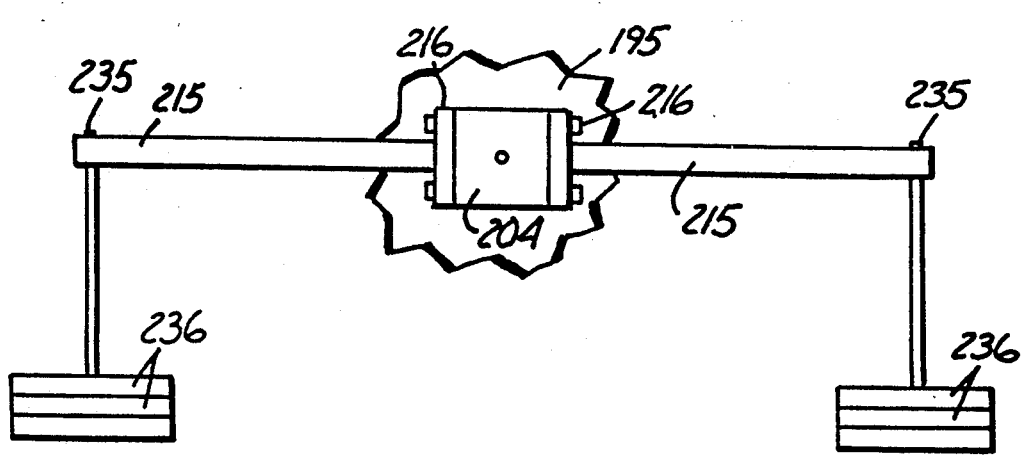
FIG. 13 is a schematic end view of a calibration body having arms thereon for roll moment calibration.

Additionally, for a "roll" loading, as shown in FIG. 13, there are a pair of oppositely directed arms indicated at 215 which are mounted with base plates 216 that are held by cap screws in provided threaded openings in the center portion of the calibration body 204.

The tapered fit in the bore 196, and the rest of the connections to the roll adjustment block 46 and to the pitch adjustment block 33, are very rigid so the sensor is rigidly held on one end.

Alignment of the sensor for obtaining the proper application of load with no shear load being introduced is quite important in the calibration steps and has been a problem in previous calibrators. With the present device, such alignments can be sensed through the zero shear flexure assemblies, and also preliminary alignment can be accomplished in a straightforward way.

Once the sensor calibration body assembly 80 is placed onto the roll adjustment block, the roll position, as well as the pitch of the sensor can be determined by first utilizing a common bubble level or electronic level. The base 11 is leveled, or is at some reference plane, and, using a level, the upper surface of the calibration body 204, such as the surface shown at 204A in FIG. 11, can be made so that it is precisely parallel with the base. This is done by leveling in a direction along the longitudinal axis 55, and also leveling the surface 204A transverse to axis 55.

The adjustments for making the calibration body parallel to the longitudinal axis are accomplished by adjusting the pitch adjustment block 33 about its transverse axis 35A utilizing the adjustment screw 31 and the thumb wheel 68, that rotates the screw inside the cylindrical block 41E which in turn causes tilting of the pitch adjustment block 33. The axis 55 can then be located so that it is precisely parallel to the reference surface of base 11, and then the screw 51 can be locked in place utilizing the lock nuts 60 and 70.

For transverse leveling of the surface 204A, the bubble level will be properly positioned and the screws 57,57 will be adjusted to rotate the head 47 by having the screws act against the surface 47B until the proper leveling is achieved.

In the calibration step, a precisely positioned dowel hole is utilized on each of the surfaces of the calibration body, and a housing, such as that shown at 180, is placed with a point member or pin 181 (see FIG. 4) in a dowel hole in the surface 204A. This dowel hole places the load application point exactly in the proper location in relation to the sensor center of loading.

A spherical seat in the cup 180 is made to receive a ball 182 that is attached to the loading member 181 to receive axial loads through the flexure assembly 161 from the vertical or transverse loading actuator 155. If the load being applied is not directly axial, the arms 165 of the spider member, as perhaps can best be seen in FIG. 12 for the spider member 125 will flex, because they are oriented with two of the arms parallel to the axis 55 and two arms transverse to it, and strain gauges 220 on the respective arms will provide a differential output from the opposite arms that can be sensed through a bridge circuit 221 to provide a reading indicating what shear loading or off center loading is occurring in relation to the calibration body. By adjusting the pitch, and the roll, this shear loading can be removed or zeroed. If both the pitch and the roll have been properly located, and there is still shear loading being evidenced, then lateral adjustment of the pitch adjustment block 33 can be made by threading the thumb wheel 38B and threading the screw 38 in the block to permit it to move a small distance laterally on its trunnions. This is done until the shear loading indicated in the flexure connection caused by eccentricity disappears.

Alignment in axial direction is accomplished by moving the axial loading assembly 16 to a position wherein the axial loading flexure member 131 is closely adjacent an end adaptor plate 225 that is again precisely positioned on the calibration body 204. A precisely drilled hole in the end adaptor plate 225 is of size to closely fit and receive the pin 132, and the axial loading assembly is then put into position sO that the pin 132 is quite close to the hole. The clamp 134 can be used for clamping the assembly 16 in position and then further adjustments of the sensor body can be made using the cylinder 119 to extend the rod 120 for positioning.

Any misalignment between the pin 132 and its opening in the adaptor 225 will again show up as differential loading in the flexure arms 124 of the flexure assembly 122, and the output from the bridge circuits for those strain gauges on the arms that are indicated at 220 in FIG. 12 will indicate which direction movements should be made to perfectly align the pin 132 with the hole in the adaptor plate 225 on the calibration body 204. The vertical and lateral adjustments are done utilizing the screw 113, for vertical adjustment, and the screw 103, for lateral adjustments, for the axial load applying members. Once zero shear is indicated on the readout from the bridge circuit, the pin 132 is known to be in proper location and the pin can be inserted into the pilot bore by operating the cylinder 119.

It is desireable to have the cylinder 119 be substantially retracted before doing the final adjustments so that less of the gas in the cylinder is used.

A loading cycle for lateral loading through the center of the sensor can be done through a plate that rests on the surface 204, and the loading can commence once the axial position is properly located. The loading can also be through a ball and support, as shown.

In the lateral loading cycle, after each increment of load, the pitch adjustment can be corrected by leveling the calibrating body while under load so that little error is introduced by inclination of the axis of the sensor from loading. The pitch axis is also located at an elevation which intersects, or nearly intersects, the longitudinal axis of the sensor. The locating of the axis in this position minimized longitudinal movement of the sensor during the pitch adjustment. The axial loading, likewise, is accomplished using the pneumatic cylinder 119, which can have a regulated pressure supply, and the calibration readings are taken from the load cell 127 for the axial loading and the load cell 173 for the vertical or transverse loading. The load cells have conventional output circuits 173A. Pitch and yaw moments are introduced by moving the load application point from the center of the sensor a very precisely measured distance and then loading through the use of the pneumatic cylinder 155. The loads on the calibration body will introduce the pitch and yaw moments. The pitch moment is applied with the calibration body having a proper surface (204A) facing upwardly, and yaw loading is with the calibration body rotated 90 degrees so the yaw loading surface is upwardly. Positive and negative yaw loading can be obtained by having the desired surface upwardly, as well as negative pitch and positive pitch loadings by having the appropriate surface facing the loading actuator.

Lateral loads in vertical and horizontal directions can be obtained by rotating the calibration body and sensor the 90 degrees or 180 degrees as desired for the direction of loading.

Tension loading along the axis of the sensor can be obtained by extending cap screws through the plate 132A and threading them into the adjacent plate 205. The tensile load can be applied by having actuator 119 be a double acting actuator.

Rotating the calibration body and sensor is accomplished by removing the screws holding the sensor adapter 195 and rotating the body and adaptor assembly the required amount.

For roll moment sensing, the adaptor arms 215, fastened at the base 216, are placed onto the calibration body, as shown schematically in FIG. 13. Suitable hangers 235 can be mounted on the opposite extending arms 215. These hangers will support precise weights indicated at 236 which act through the lever arm such that when the weights on one side are sequentially removed there will be a roll moment in the appropriate direction exerted on the calibration body 204 and through the calibration body on the sensor and pin 215. The sensor is kept from rotating by its attachment to the sensor adaptor and the roll adjustment head.

The roll calibration is done by removing weights in sequence from one side after total weights have been applied to both sides, and observing the calibration readings.

The output of the sensor is through suitable circuitry to obtain the necessary readings, and the load cells that are used for calibrating also can be prepared so that the load cell readings can be precise, and there will not be any shear loading through the load cells because the zero shear flexures that are provided for determining that no shears apply.

In FIG. 10, a different type of loading train is shown for illustrative purposes, and it should be noted that the axial position of the calibration body, as well as the lateral position, can be precisely determined with gauge blocks that are referenced from the base 11. The base 11 precisely tools the center of the actuator 155 through its supporting bridge structure.

Although the present invention has been described with reference to preferred embodiments, workers skilled in the art will recognize that changes may be made in form and detail without departing from the spirit and scope of the invention.

What is claimed is:

1. A calibration stand for a sensor comprising:
   a base, said base having a longitudinal axis and a transverse width;
   a first sensor support assembly mounted on said base and having means for supporting a sensor for calibration;
   a sensor loading assembly mounted on the base and positioned spaced from the first assembly and having means for applying a load to the sensor supported on the support assembly along a loading axis which is generally parallel to the longitudinal axis;
   the first assembly including means for adjusting the pitch of the means for supporting the sensor relative to the longitudinal axis of said base.

2. The calibration stand of claim 1 wherein said first sensor support assembly includes means for adjusting the means for supporting a sensor in a direction lateral of the longitudinal axis of said base.

3. The calibration stand of claim 1 wherein said means for supporting a sensor on the first support assembly comprises a block, means to mount said block on said means for adjusting the pitch, and means for permitting adjustment of said block rotationally about an axis generally parallel to the longitudinal axis of said base.

4. The calibration stand of claim 3 and means for permitting adjustment of the means for supporting a sensor in a direction perpendicular to the longitudinal axis of said base.

5. The calibration stand of claim 1 wherein said sensor loading assembly comprises a frame, and the means for applying a load further comprises a lateral loading actuator mounted for movement generally transverse to the longitudinal axis of the base, and including means for determining when the load being applied by the lateral loading actuator is along a desired axis intersecting a known axis of said sensor.

6. The calibration stand of claim 5 wherein said means for determining comprises means for determining when shear load is introduced into the sensor supported on the sensor support assembly, and comprises a spider having at least four arms oriented in desired directions relative to a reference axis of the senor to be calibrated, said arms being flexure connections for carrying loads from the actuator means to the sensor to be calibrated, and means for determining the loads applied through each of said arms, whereby differences in loads in the arms can be obtained.

7. The apparatus as specified in claim 6 and load cell means between the sensor to be calibrated and said load applying actuator for determining the total load applied by the actuator.

8. A calibration stand for a sensor comprising a base, said base having a longitudinal axis and a transverse width, a first sensor support assembly mounted on said base and having means for supporting a sensor for calibration, a sensor loading assembly mounted on the base and positioned spaced from the first sensor support assembly, the first sensor support assembly including means for adjusting the pitch of the means for supporting the sensor relative to the longitudinal axis of said base, the sensor supported by the means for supporting a sensor having a longitudinal loading axis and said means for adjusting the pitch comprising a block pivotally mounted with respect to the first sensor support assembly, said pivotal mounting being about an axis substantially at a level of the sensor longitudinal loading axis and generally transverse to the longitudinal axis of said base.

9. The calibration stand of claim 8 and means to measure the loads located by the sensor loading assembly.

10. A calibration stand for a sensor comprising a base, said base having a longitudinal axis and a transverse width, a first sensor support assembly mounted on said base and having means for supporting a sensor for calibration, a sensor loading assembly mounted on the base and positioned spaced from the first sensor support assembly, the first sensor support assembly including means for adjusting the pitch of the means for supporting the sensor relative to the longitudinal axis of said base, wherein the means for supporting the sensor for calibration has a reference axis coinciding with a reference axis of the sensor supported thereon, said reference axis being generally parallel to the longitudinal axis of the base, and wherein said sensor loading assembly mounted on the base comprises an axial loading actuator including means for applying loads generally along the reference axis of the sensor mounted on the means for supporting a sensor.

11. The calibration stand of claim 10 wherein said means for applying a load along the reference axis comprises an axially loading actuator movable along an axis generally parallel to the longitudinal axis of the base, said sensor loading assembly including a frame, means for mounting said axial loading actuator on said frame, and adjustment means for adjusting the axially loading actuator relative to the frame in two mutually perpendicular directions, both of which are perpendicular to and extend transversely of the reference axis of the sensor supported on the means for supporting a sensor.

12. The calibration stand of claim 11 and means between said loading actuator and the sensor for determining when the load from the loading actuator is offset from the reference axis of the sensor to be calibrated.

13. A calibration stand for a sensor having a reference axis, for calibrating the sensor for loading in a direction along the reference axis, and selectively along mutually perpendicular axes transversely to the reference axis, comprising:

a base having a longitudinal axis parallel to the reference axis of the sensor to be calibrated;
a first sensor support assembly mounted on said base for movement in a direction along the longitudinal axis of said base, and having means for supporting the sensor for calibration thereon;
a sensor loading assembly mounted on the base and adapted to apply loads onto the sensor supported on the means for supporting the sensor along at least one of the axes of calibration, said sensor loading assembly including means for applying a load along such axis; and
means for determining when the load applied along the axis of loading of the load applying means is offset from intersection with the reference axis of the sensor supported on the means for supporting the sensor.

14. The calibration stand as specified in claim 13, said means for supporting the sensor for calibration comprising a block that is adjustably mounted with respect to the rest of the first sensor support assembly for permitting adjustment of the pitch of the reference axis of the sensor supported on the means for supporting relative to the longitudinal axis of the base, and for permitting rotational adjustment of such sensor about the reference axis of the sensor.

15. The calibration stand as specified in claim 14 wherein the means for applying the load on said sensor loading assembly is adjustable along at least two mutually perpendicular axes, and is mounted on the base and oriented to apply loading along the reference axis of the sensor supported on the means for supporting.

16. A portable calibration stand for a multicomponent sensor comprising a base, said base having a longitudinal axis;

a first support assembly mounted on said base;
a second assembly mounted on said base and spaced from said first support assembly;
first means to support a sensor on said first support assembly;
a loading frame mounted on said base and positioned between said first and second assemblies, and comprising a loading element spaced from said base sufficiently to permit a sensor to be calibrated to be mounted between said support assemblies and to clear said loading frame, said loading element being mounted to apply a force perpendicular to the longitudinal axis of said base onto a sensor supported by the first mounting assembly;
force generating means on at least one of said first and second assemblies to apply a force to a sensor supported thereon generally parallel to the longitudinal axis of said base;
means for permitting adjustment of the one assembly having the force generating means in directions perpendicular to the direction of the longitudinal axis of the base to permit positioning of the axis of the application of force at a desired position; and
means for permitting adjustment of the first and second assemblies toward and away from each other.

17. The calibration stand of claim 16 wherein said first means for supporting a sensor to be calibrated on the first loading assembly comprises a block mounted on the first loading assembly about a second axis transverse to the longitudinal axis of said base, and means for permitting adjustment of said block about said second axis to adjust the pitch of the first means for supporting a sensor on the first loading assembly.

18. A compact portable calibration stand for multicomponent sensor comprising a base, said base having a longitudinal axis;

a first assembly mounted on said base and including first means to support a sensor to be tested on the first assembly, the means to support a sensor being adjustable in a direction along the longitudinal axis of the base, and being adjustable relative to the base for lateral, pitch and roll adjustments of a sensor supported thereon;

a second assembly supported on the base and spaced from the first assembly, said second assembly including a first actuator thereon which will engage the sensor supported in the means to support a sensor and provide axial loads on the sensor, said first actuator having a longitudinal axis extending generally parallel to the longitudinal axis of the base, and said first actuator being mounted to the second assembly to permit mounting adjustments in direction parallel to the longitudinal axis of the base, and lateral to the longitudinal axis of the first actuator; and a third assembly comprising a loading frame positioned between the first and second assemblies, said loading frame having a second actuator mounted thereon for applying a load to the sensor generally laterally of the axis of the first-mentioned actuator on the second assembly, and said second actuator means for engaging a sensor mounted on the means to support a sensor.

19. The calibration stand as claimed in claim 18, and means positioned between the first assembly and the sensor to sense when the load application direction for loads applied by the first actuator on the sensor deviate from a desired axis.

20. The calibration stand of claim 18 including means positioned between the second actuator and the sensor supported in the means for supporting a sensor for determining when the direction of application of loads applied by the second actuator to the sensor deviate from load application along a desired axis.

* * * * *

UNITED STATES PATENT AND TRADEMARK OFFICE
CERTIFICATE OF CORRECTION

PATENT NO. : 5,020,357

DATED : June 4, 1991

INVENTOR(S) : Nebojsa Kovacevic et al.

It is certified that error appears in the above-identified patent and that said Letters Patent is hereby corrected as shown below:

Col. 12, line 65, delete "senor", insert --sensor--.

Col. 13, line 25, delete "located", insert --exerted--.

Signed and Sealed this

Twentieth Day of October, 1992

Attest:

DOUGLAS B. COMER

Attesting Officer

Acting Commissioner of Patents and Trademarks